B. W. BOSTON.
WINDMILL.
APPLICATION FILED FEB. 10, 1920.

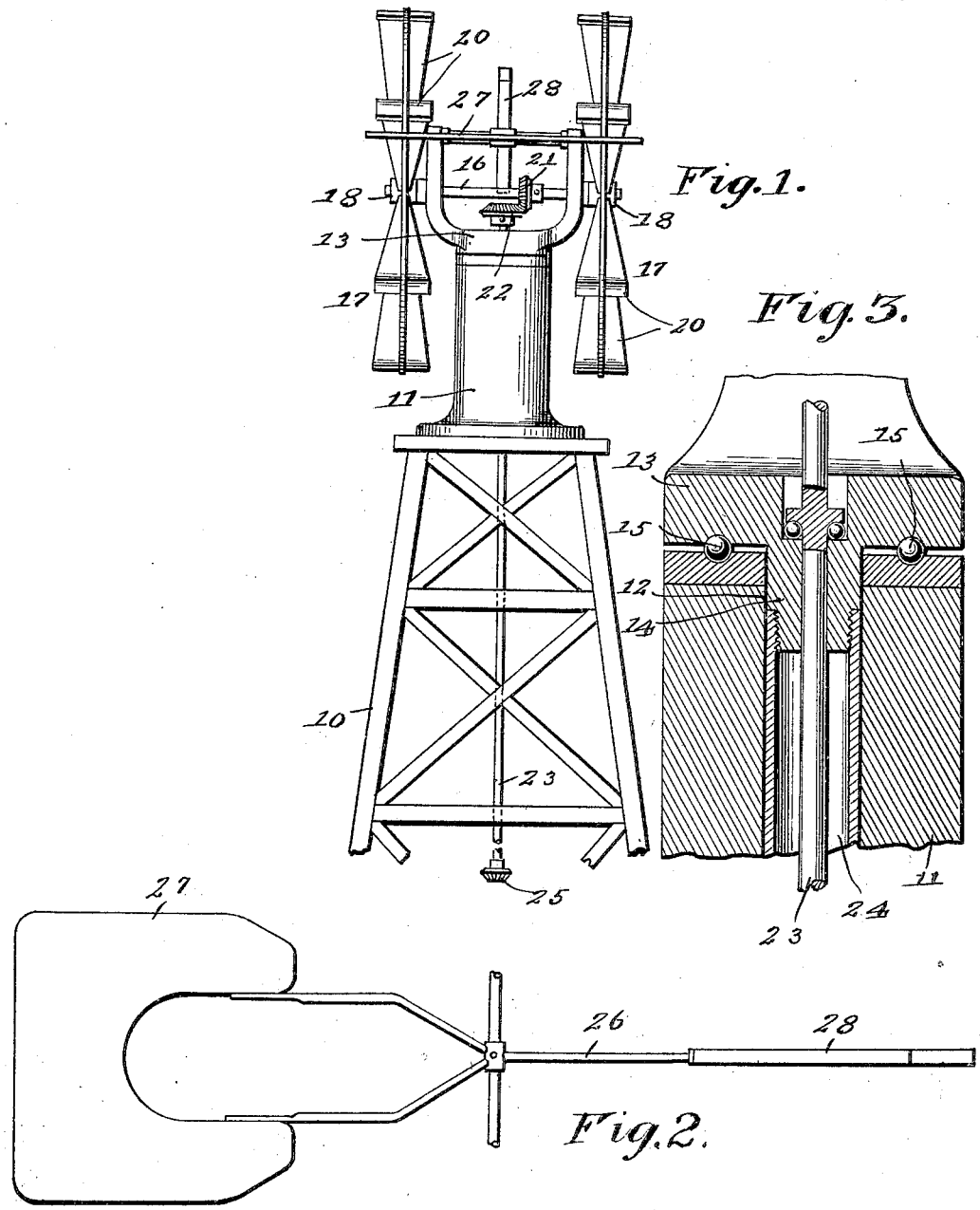

1,397,031.

Patented Nov. 15, 1921.
2 SHEETS—SHEET 2.

Witnesses
R. A. Thomas
J. Milton Jester

Inventor
B. W. Boston

By Victor J. Evans
Attorney

UNITED STATES PATENT OFFICE.

BENJAMIN W. BOSTON, OF PENDLETON, INDIANA.

WINDMILL.

1,397,031.  Specification of Letters Patent.  Patented Nov. 15, 1921.

Application filed February 10, 1920. Serial No. 357,603.

*To all whom it may concern:*

Be it known that I, BENJAMIN W. BOSTON, a citizen of the United States, residing at Pendleton, in the county of Madison and State of Indiana, have invented new and useful Improvements in Windmills, of which the following is a specification.

This invention relates to windmills and has for its object the provision of a windmill structure in which the wind driven wheels are so mounted as to receive the force of the wind directly against the blades thereof instead of at an angle as in the ordinary construction, this arrangement having the advantage of obtaining the maximum power from the wind.

An important object is the provision of a windmill of this character in which the head carries a shield normally covering only the lower half of the wheels so that the wind may act upon the upper halves of the wheels for effecting rotary movement thereof, this shield being movable to a neutral position covering portions of the wheels above and below their shaft whereby to render the wheels inactive.

Another object is the provision of a windmill of this character in which the wind shield has associated therewith a guide vane acted upon by the wind for always maintaining the wheels in position to receive the full force of the wind.

A further object is the provision of a windmill of this character in which the head carrying the wheels is supported upon a scaffold, ball or roller bearings being interposed at the bearing surfaces whereby to facilitate rotary movement of the head under the influence of the guide vane.

An additional object is the provision of a windmill of this character which will be comparatively simple and inexpensive in construction, highly efficient in use, durable and powerful in service, and a general improvement in the art.

With the above and other objects and advantages in view, the invention consists in the details of construction to be hereinafter more fully described and claimed, and illustrated in the accompanying drawings in which—

Figure 1 is a side elevation of the complete windmill,

Fig. 2 is a detail view of the vane,

Fig. 3 is a detail cross sectional view showing the bearing for the rotary head.

Figure 4:
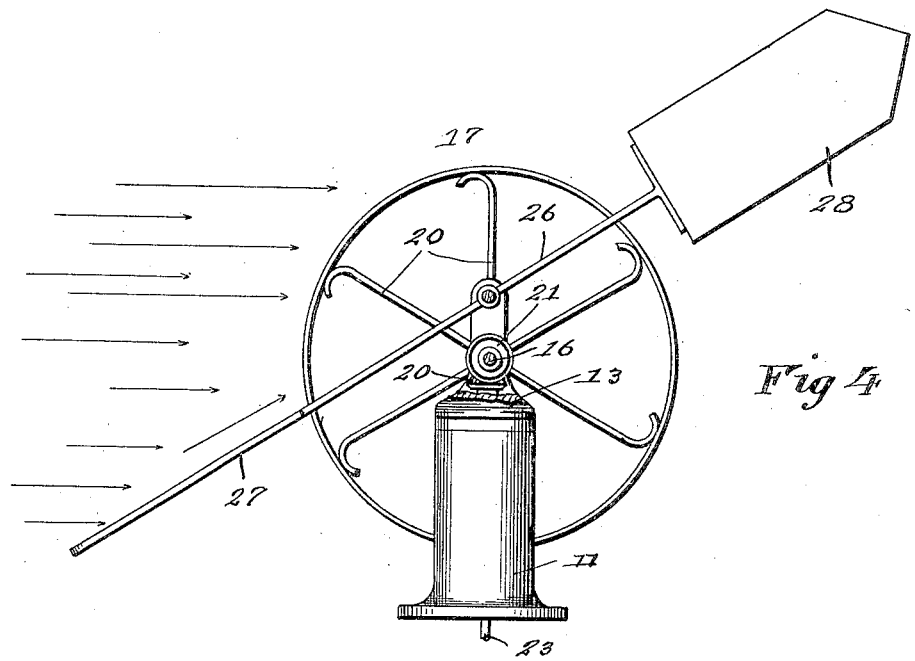
Fig. 4 is an enlarged longitudinal sectional view through the head and its associated parts, showing the wind shield in normal position.
Figure 5:
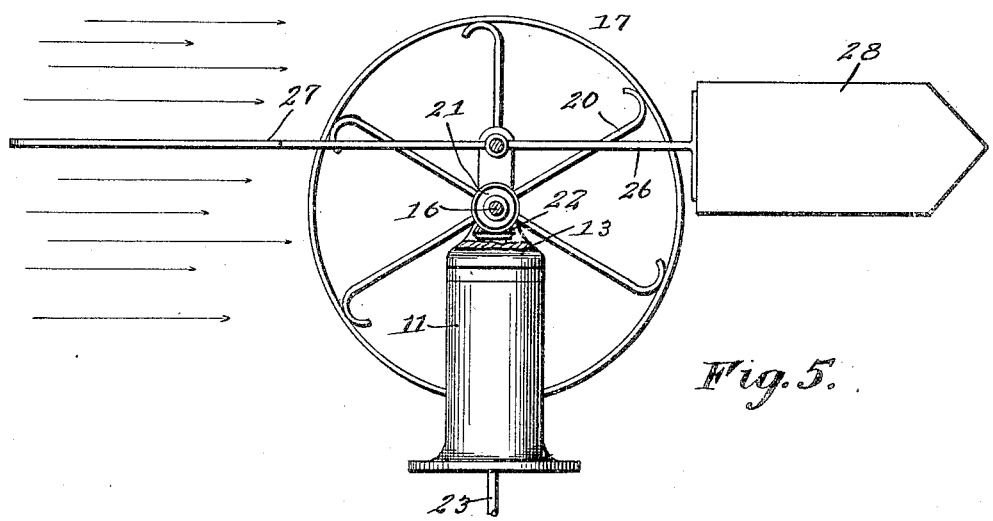
Fig. 5 is a similar view showing the wind shield in position to render the wheels inoperative.

Referring more particularly to the drawings, the numeral 10 designates a supporting scaffold which may be of preferred or conventional type and formed either of wood or metal, as desired. Rigidly secured upon the upper end of this scaffold is a tubular standard 11 which is recessed at its upper end, as shown at 12.

Disposed upon the upper end of the standard 11 is a head 13 which is rotatable upon the standard and which is provided with a reduced tubular extension 14 disposed within the recess 12. Ball or roller bearings 15 are interposed between the head 13 and the upper end of the standard 11 for reducing friction to the minimum. The disposition of the extension 14 within the recess 12 serves to hold the head in position so as to prevent wabbling or dislocation thereof.

Journaled through the head 13 and extension 14 is a shaft 16 upon the ends of which are secured wheels 17. Each wheel includes a hub portion 18, a plurality of radial triangular shaped blades 20 having curved outer ends and the outer reinforcing element 20ᵃ connected to the blades which has the function of giving the wheel rigidity and preventing wabbling or displacement of the blades. Secured centrally upon the shaft 16 is a bevel gear 21 which meshes with the bevel gear 22 secured upon the upper end of a vertical shaft 23 which extends downwardly through a guide tube 24 depending from the head and which carries at its lower end a gear 25 by means of which power derived from the rotation of the wheels 17 may be transmitted to any mechanism to be driven. Any suitable governor mechanism, not shown, but which may be of any preferred or conventional type, is located on the shaft 23 at any desired point, preferably immediately beneath the gear 22.

Carried by the head 13 and extending at right angles with respect to the shaft 16, is a rod 26 on one end of which is secured a wind shield 27 which may be formed of sheet metal and which is of a size and shape to cover normally the lower halves of the wheels 17 so that the wind will impinge against only the upper halves thereof. Upon the other end of this rod 26 is secured a vane 28 which balances the wind shield 27 and which is provided for the purpose of holding the wheels 17 always toward the wind. Any suitable mechanism may be provided for connecting the wind shield with the governor mentioned but not described whereby the position of the wind shield may be varied to cover more or less of the wheels at both of the axes thereof whereby to control the speed. A suitable connecting device may also be provided attached to the wind shield for swinging the same so that it will obstruct or cover equal portions of the top and bottom halves of the wheels for rendering the wheels inactive when desired.

In the operation of the device it will be seen that when the wind shield is in position covering only the lower halves of the wheels, the wheels will be rotated by the force of the wind thereagainst and this rotary movement will be imparted through the intermeshing bevel gears to the vertical shaft 23 from which the power is transmitted to the machinery to be driven. When the wind changes its direction the vane or tail 28 will be moved thereby so as to bring the wheels 17 directly against the wind for receiving the maximum power therefrom.

From the foregoing description and a study of the drawings it is believed that the operation and utility of the device will be thoroughly understood without the necessity for any further detailed description.

While I have shown and described the preferred embodiment of my invention, it is of course to be understood that I reserve the right to make such changes in the form, construction, and arrangement of parts as will not depart from the spirit of the invention or the scope of the subjoined claim.

Having thus described my invention, I claim—

A windmill comprising a supporting derrick, a support secured thereon, a head rotatable on said support, a shaft journaled through said head, spaced upstanding parallel arms on said head, a transverse shaft journaled through said arms, meshing bevel gears carried by said first and second named shafts, wind wheels and said horizontal shaft outwardly of said arms, a rock shaft journaled through the upper extremities of said arms, and a vane rockably mounted on said rock shaft, said vane having a horizontal blade at one end and a vertical blade at the other end.

In testimony whereof I affix my signature.

BENJAMIN W. BOSTON.